(12) United States Patent
Place et al.

(10) Patent No.: US 11,773,726 B2
(45) Date of Patent: Oct. 3, 2023

(54) ANGLED TIP RODS

(71) Applicant: RTX Corporation, Farmington, CT (US)

(72) Inventors: Emma J. Place, New Hartford, CT (US); Carlos Calixtro, Atlanta, GA (US)

(73) Assignee: RTX CORPORATION, Farmington, CT (US)

(\*) Notice: Subject to any disclaimer, the term of this patent is extended or adjusted under 35 U.S.C. 154(b) by 0 days.

(21) Appl. No.: 17/498,551

(22) Filed: Oct. 11, 2021

(65) Prior Publication Data
US 2022/0025769 A1 Jan. 27, 2022

Related U.S. Application Data

(63) Continuation-in-part of application No. 16/654,674, filed on Oct. 16, 2019, now Pat. No. 11,143,035.

(51) Int. Cl.
*F01D 5/20* (2006.01)
*F01D 5/18* (2006.01)

(52) U.S. Cl.
CPC ............... *F01D 5/18* (2013.01); *F01D 5/20* (2013.01); *F05D 2220/32* (2013.01); *F05D 2230/21* (2013.01); *F05D 2240/307* (2013.01)

(58) Field of Classification Search
CPC ......... F01D 5/18; F01D 5/20; F05D 2240/307
See application file for complete search history.

(56) References Cited

U.S. PATENT DOCUMENTS

| | | | |
|---|---|---|---|
| 6,915,840 B2 | 7/2005 | Devine, II et al. |
| 6,929,054 B2 | 8/2005 | Beals et al. |
| 7,562,691 B2 | 7/2009 | Guerche et al. |
| 2008/0164001 A1 | 7/2008 | Morris et al. |

(Continued)

FOREIGN PATENT DOCUMENTS

| | | |
|---|---|---|
| EP | 2942488 A1 | 11/2015 |
| EP | 3354853 A1 | 8/2018 |

(Continued)

OTHER PUBLICATIONS

European Search Report Application No. EP20202401; dated Feb. 12, 2021; pp. 10.

(Continued)

*Primary Examiner* — Eldon T Brockman
(74) *Attorney, Agent, or Firm* — CANTOR COLBURN LLP (57) ABSTRACT

A core is provided for fabricating a blade to include an airfoil. The airfoil includes pressure and suction surfaces, leading and trailing edges extending along the pressure and suction surfaces and a tip shelf with a first sweep configuration and a wall. The core includes channel sections configured to form internal channels within the airfoil by casting processes and tip rods extending from respective portions of the channel sections proximate to a tip shelf location. The respective portions of the channel sections have a second sweep configuration corresponding to the first sweep configuration. The tip rods are configured to extend through the wall at an angle of about 5-12 degrees inclusive relative to a normal angle of the wall during the casting processes to form through-holes angled at about 5-12 degrees inclusive in the wall.

19 Claims, 7 Drawing Sheets

(56) References Cited

U.S. PATENT DOCUMENTS

| | | | |
|---|---|---|---|
| 2008/0175716 A1* | 7/2008 | Potier | F01D 11/10 |
| | | | 416/97 R |
| 2013/0243596 A1* | 9/2013 | Quach | F01D 5/20 |
| | | | 416/92 |
| 2014/0030102 A1* | 1/2014 | Mishra | F01D 5/20 |
| | | | 416/223 R |
| 2014/0037458 A1* | 2/2014 | Lacy | F01D 5/20 |
| | | | 416/97 R |
| 2015/0132139 A1 | 5/2015 | Tran et al. | |
| 2017/0167275 A1* | 6/2017 | Schroeder | F02C 7/18 |
| 2018/0340426 A1* | 11/2018 | Mongillo | F02C 3/04 |
| 2021/0115799 A1* | 4/2021 | Place | B22D 25/02 |
| 2021/0154729 A1 | 5/2021 | Castle | |

FOREIGN PATENT DOCUMENTS

| | | | |
|---|---|---|---|
| EP | 3808941 A1 | 4/2021 | |
| FR | 3072415 A1 | 4/2019 | |

OTHER PUBLICATIONS

Search Report issued in European Patent Application No. 22200953.2; Application Filing Date Oct. 11, 2022; dated Mar. 20, 2023 (5 pages).

* cited by examiner

ANGLED TIP RODS

CROSS-REFERENCE TO RELATED APPLICATIONS

This application is a Continuation-in-Part of Non-Provisional application Ser. No. 16/654,674 filed Oct. 16, 2019, the disclosure of which is incorporated herein by reference in its entirety.

BACKGROUND

Exemplary embodiments of the present disclosure relate generally to gas turbine engines and, in one embodiment, to angled tip rods used to cast holes in tips of blade cores of airfoils.

Airfoils are present in many aerodynamic applications including, but not limited to, turbines of gas turbine engines. These turbine airfoils each have a root, a tip, pressure and suction surfaces that extend from root to tip and leading and trailing edges at leading and trailing sides of the pressure and suction surfaces. In a turbine, the turbine airfoils or turbine blades can aerodynamically interact with high temperature and high pressure fluids to cause a rotor to rotate.

During operations, gas turbine engines ingest dirt and this dirt travels through the compression system and the combustor and into the cores of the turbine blades where the dirt and air is flung or pumped to the outer diameters or tips of the turbine blades. Typically, the majority of the dirt particles are extremely fine and flows within the cooling air streams that are used to cool the internals of the turbine blades. However, in some cases, the dirt particles are too large to make the abrupt turns inside the internal passages of the turbine blades and they adhere to the outermost surfaces of the turbine blade internals. This can result in an accumulation of dirt on those outermost surfaces and, at given temperatures, can cause premature metallurgical degradation as well as create unwanted insulated areas within the airfoil. The accumulation of dirt can also tend to increase the tip pull of the turbine blades thus reducing the structural integrity of the blade root and disk lugs and altering the expected structural and vibration responses of the turbine blade.

Therefore, it is common practice to have at least one relatively large hole at the tip of the core of each turbine blade. This hole allows entrained relatively large dirt particles to escape out of the turbine blade and into the gas path and out the back of the gas turbine engine.

The holes are typically cast using alumina or quartz rods.

During turbine blade investment casting processes, the alumina or quartz rods can also be used as core position control features to assist in casting. Cores of turbine blades (or blade cores) shift around during the casting process so it is necessary to provide tip features that allow control of blade core shift in all directions. This is especially important in multi-core blade designs where both hot and cold walls and internal blade core ribs must be protected. Tip rods can be used as blade core locators to control radial, axial and tangential shifts of blade cores. When one blade core has multiple tip rods extending out of the tip, they are often connected by a tip plenum that extends outside of the final machined part. The tip plenum helps to provide core stability by controlling internal blade core ribs and can also be used as a blade core locator in conjunction with the tip rods.

Blade core leaching is also a concern in complex blade core designs with multiple dead end cavities. Alumina or quartz rods can be used to assist by being embedded into dead end cavities and extending outside of the finished casting. This creates a path for the ceramic blade core to exit the part during leaching. If rods cannot be used, internal core ties are often required that connect multiple blade core cavities together that would alter the cooling scheme of the turbine blade and, due to sizing requirements, may negatively impact part durability.

Alumina and quartz tip rods should meet specific sizing requirements in order to ensure cast-ability. These requirements include meeting a minimum rod diameter (e.g., about 0.035" for quartz rods), meeting a maximum unsupported length (e.g., about 1.5× the rod diameter) and the fact that rods should be embedded into blade core material by a minimum distance (e.g., about 0.065"-0.100"). In addition, rods must be surrounded by 0.025" of blade core thickness.

In turbine blade airfoils with a sweep at the tip, radially oriented rods often do not meet producible tip rod sizing criteria, such as specifically embedded length and core thickness requirements, due to the curvature of the blade cores at the tip. The tip rods that are incorporated and that do not meet sizing criteria are highly likely to break during casting causing increased scrap.

Accordingly, it is necessary to devise tip rod geometry that can be used in turbine blades with an airfoil sweep that meets producible tip rod sizing criteria.

BRIEF DESCRIPTION

According to an aspect of the disclosure, a core is provided for fabricating a blade to include an airfoil. The airfoil includes pressure and suction surfaces, leading and trailing edges extending along the pressure and suction surfaces and a tip shelf with a first sweep configuration and a wall. The core includes channel sections configured to form internal channels within the airfoil by casting processes and tip rods extending from respective portions of the channel sections proximate to a tip shelf location. The respective portions of the channel sections have a second sweep configuration corresponding to the first sweep configuration. The tip rods are configured to extend through the wall at an angle of about 5-12 degrees inclusive relative to a normal angle of the wall during the casting processes to form through-holes angled at about 5-12 inclusive in the wall.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the channel sections include a bumper proximate to an internal end of at least one of the tip rods.

In accordance with additional or alternative embodiments, external ends of the tip rods are coupled to a plenum body.

According to another aspect of the disclosure, a method of assembling a core for fabricating a blade is provided such that the blade includes an airfoil. The airfoil includes pressure and suction surfaces, leading and trailing edges extending along the pressure and suction surfaces and a tip shelf with a first sweep configuration and a wall. The method includes forming channel sections configured to form internal channels within the airfoil by casting processes, disposing tip rods to extend from respective portions of the channel sections proximate to a tip shelf location, the respective portions of the channel sections having a second sweep configuration corresponding to the first sweep configuration and executing the casting processes to cast the blade whereby the tip rods extend from the internal channels and through the wall at an angle of about 5-12 inclusive relative to a normal angle of the wall to form through-holes angled at about 5-12 degrees inclusive in the wall.

In accordance with additional or alternative embodiments, the method further includes forming a squealer pocket in the tip shelf.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the forming of the channel sections includes forming a bumper proximate to an internal end of at least one of the tip rods.

In accordance with additional or alternative embodiments, the method further includes coupling external ends of the tip rods to a plenum body.

In accordance with additional or alternative embodiments, the executing of the casting process includes executing an investment casting process to cast the blade around the core and to remove the core and the method further includes removing the tip rods from the blade via the through-holes in the wall upon completion of the investment casting process.

According to another aspect of the disclosure, a blade structure is provided and includes tip rods and an airfoil. The airfoil includes pressure and suction surfaces, leading and trailing edges extending along the pressure and suction surfaces and a tip shelf with a sweep configuration and a wall. The airfoil defines internal channels and the tip rods extend from the internal channels and through the wall at an angle of about 5-12 inclusive relative to a normal angle of the wall.

In accordance with additional or alternative embodiments, the airfoil extends from a platform interposed between a root and the airfoil.

In accordance with additional or alternative embodiments, the sweep configuration is characterized as a sweep of the tip shelf relative to a rest of the airfoil.

In accordance with additional or alternative embodiments, the tip shelf defines a squealer pocket.

In accordance with additional or alternative embodiments, the tip rods include at least one or more of alumina and quartz.

In accordance with additional or alternative embodiments, the angle is 5 degrees relative to the normal angle of the wall.

In accordance with additional or alternative embodiments, the airfoil further includes internal components defining the internal channels and one of the internal components proximate to an internal end of at least one of the tip rods defines a divot.

In accordance with additional or alternative embodiments, the tips rods are removable from the airfoil via through-holes formed in the wall by the tip rods

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
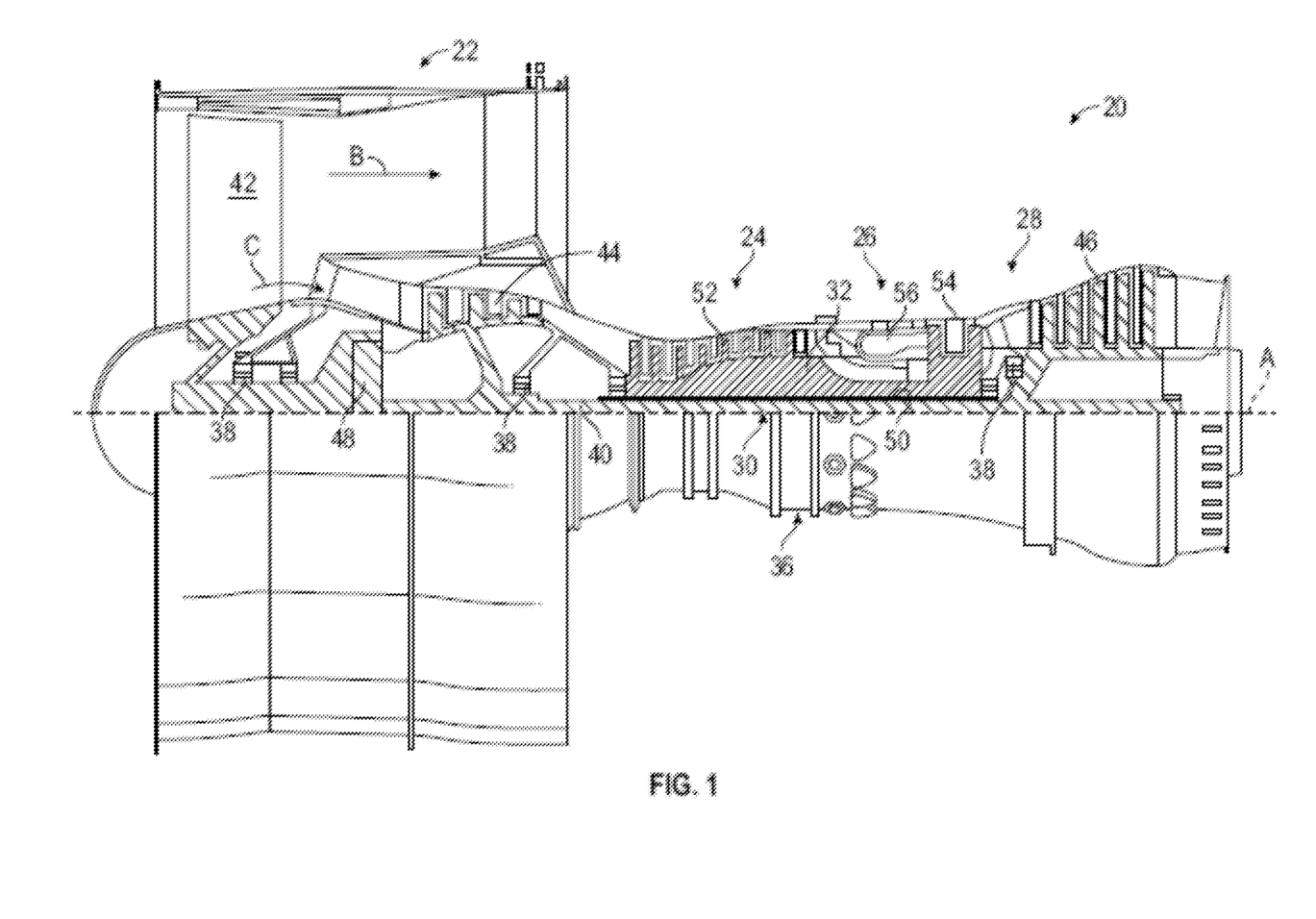
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

As will be described below, a tip rod geometry is provided for use in turbine blades with an airfoil sweep that meets producible tip rod sizing criteria. The tip rods are made of alumina or quartz and are located at the tip of a blade core at an angle. In locations where embedded rod lengths can be met but core thicknesses around the rod are not met, additional core support features, such as bumpers, can be used to meet producibility criteria and to add additional wall thickness controls.

Figure 2:
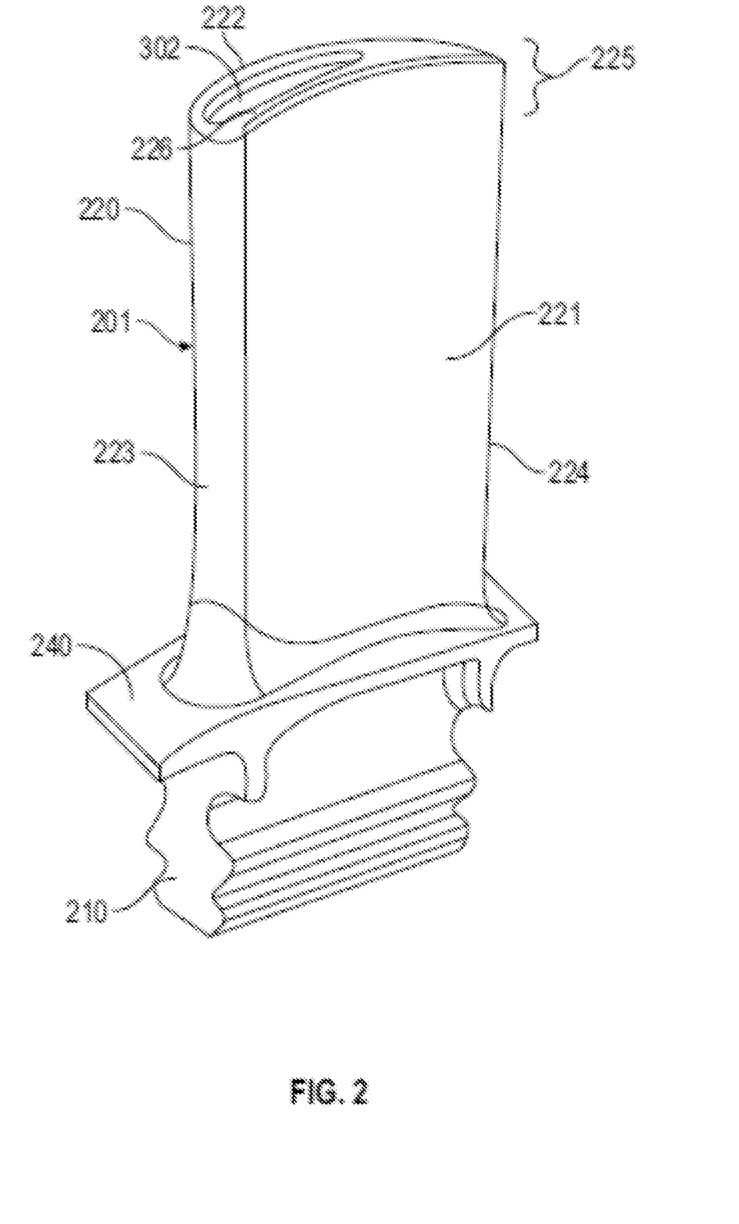
FIG. 2 is a perspective view of a turbine blade of a turbine section of a gas turbine engine in accordance with embodiments.
Figure 3:
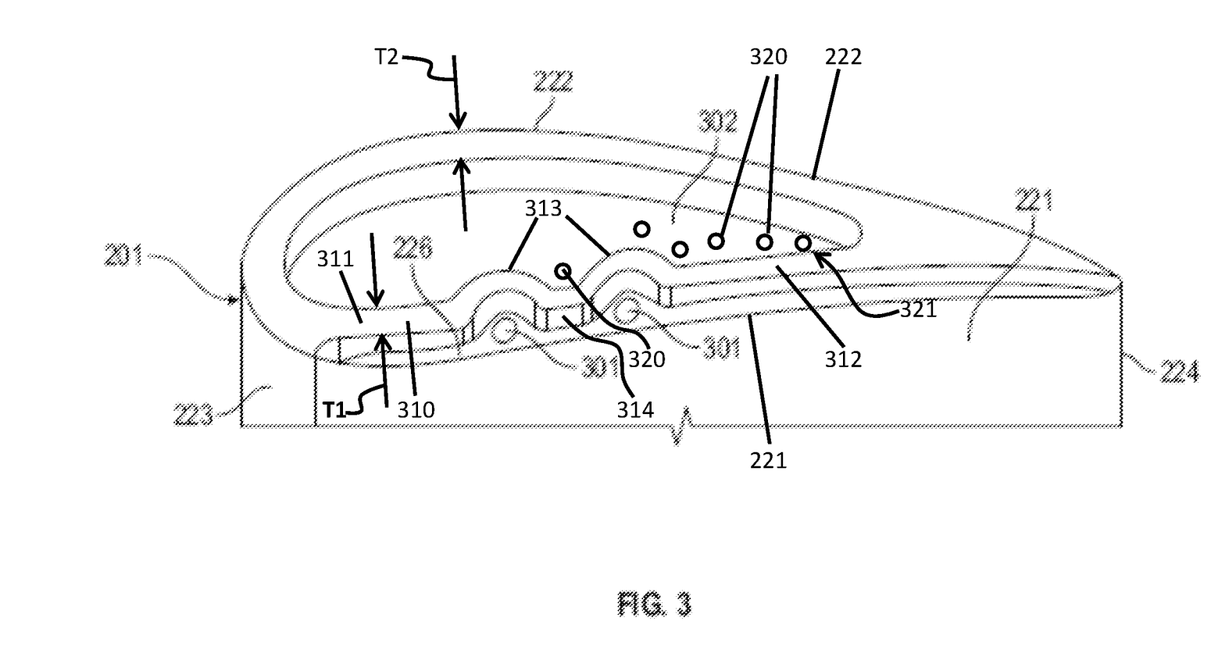
FIG. 3 is an enlarged perspective view of a tip shelf in accordance with further embodiments.

With reference to FIGS. 2 and 3, a turbine blade 201 is provided for use in at least the compressor section 24 and the turbine section 28 of the gas turbine engine 20 of FIG. 1.

The turbine blade 201 includes a root 210 with a dovetail or fir tree cross-section, an airfoil 220 and a platform 240 that is radially interposed between the root 210 and the airfoil 220. The airfoil 220 extends radially outwardly from the platform 240 and includes a pressure surface 221, a suction surface 222 opposite the pressure surface 221, leading and trailing edges 223 and 224 extending along leading and trailing ends of the pressure and suction surfaces 221 and 222 and a tip shelf 225 at a distal, radially outboard end of the airfoil 220. The tip shelf 225 has a first sweep configuration 701, which is characterized as a sweep of the tip shelf 225 relative to the rest of the airfoil 220 (see FIG. 7), and a wall 226. The airfoil 220 is formed to define internal channels 702 (see FIG. 7), which will be described below, and the wall 226 is formed to define obliquely-angled through-holes 301 (see FIG. 3), which will also be described below. The obliquely-angled through-holes 301 are defined at an oblique angle α (see FIG. 7) relative to a normal angle of the wall 226.

Figure 7:
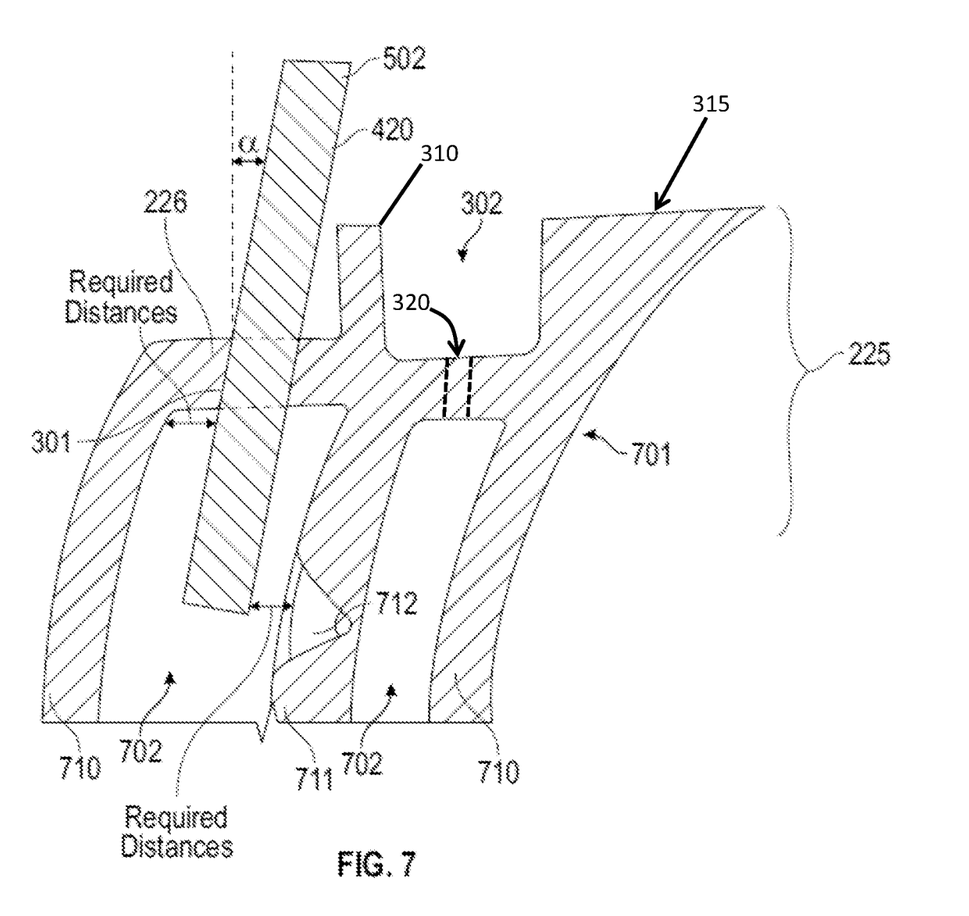
FIG. 7 is a front view of a portion of a blade structure during an investment casting process to form an airfoil of the turbine blade of FIGS. 2 and 3 in accordance with embodiments.

In accordance with embodiments, the angle α can be about 5 degrees or slightly less, 5-12 degrees inclusive or about 12 degrees or slightly more.

As shown in FIG. 3, the tip shelf 225 can be curved to maintain a substantially uniform depth of about 0.03" or the tip shelf 225 can be flat or straight with a maximum depth of about 0.030" and a minimum depth of 0.033" at a central point in the tip shelf 225, a maximum depth of about 0.035" and a minimum depth of 0.024" at the leading edge 223 and a maximum depth of about 0.026" and a minimum depth of 0.015" at the trailing edge 224. In any case, the tip shelf 225 is formed to define a squealer pocket 302 with an optional 0.01" step. The obliquely-angled through-holes 301 can be defined adjacent to a wall 310 surrounding the squealer pocket 302 and along the pressure surface 221. The wall 310 extends radially outwardly from the tip shelf 225 and delimits a periphery of the squealer pocket 302.

In accordance with embodiments, the wall 310 at the pressure surface 221 can have a substantially uniform thickness T1 (of about 0.03" nominal, 0.02" minimal) from an upstream portion 311 thereof, which is disposed axially between the through-holes 301 and the leading edge 223, to a downstream portion 312 thereof, which is disposed axially between the through-holes 301 and the trailing edge 224. To achieve this substantially uniform thickness T1, the wall 310 curves inwardly into the squealer pocket 302 around each of the through-holes 301 to form notched or convex sections 313. The wall 310 can also include a straight or flat section 314 between the notched or convex sections 313.

In accordance with further embodiments, while the wall 310 has the substantially uniform thickness T1 from the upstream portion 311 to the downstream portion 312, the wall 310 can continue around an entirety of the squealer pocket 302 and can have varying thicknesses at several different sections. For example, the wall 310 can have a slightly increased thickness at or near the leading edge 223 and a significantly increased thickness at or near the trailing edge 224. In addition, the wall 310 at the suction surface 222 can have varying thicknesses T2 that each exceed the magnitude of the substantially uniform thickness T1. In some cases, the wall 310 can have a wedge-shape 315 (see FIG. 7) at the suction surface 222. The wedge-shape 315 allows for more material to be provided to the wall 310 during installing and initial operations. At a base of the wedge-shape 315, the wall 310 can have a thickness of about 0.03" nominal or about 0.02" minimum.

Notably, when blades and blade outer air seals (BOAS) interact, a goal is for the BOAS to lose material and the blades to remain intact. However, if the blade is too solid at the tip, there will be too much material to cool during engine operation and the tip will oxidize. Due to the tip bow and squealer pocket design in this case, there is more material at the tip during initial engine operation (when the blades and BOAS "break in") but less material to cool on the blade tips once any rub has occurred.

Figure 4:
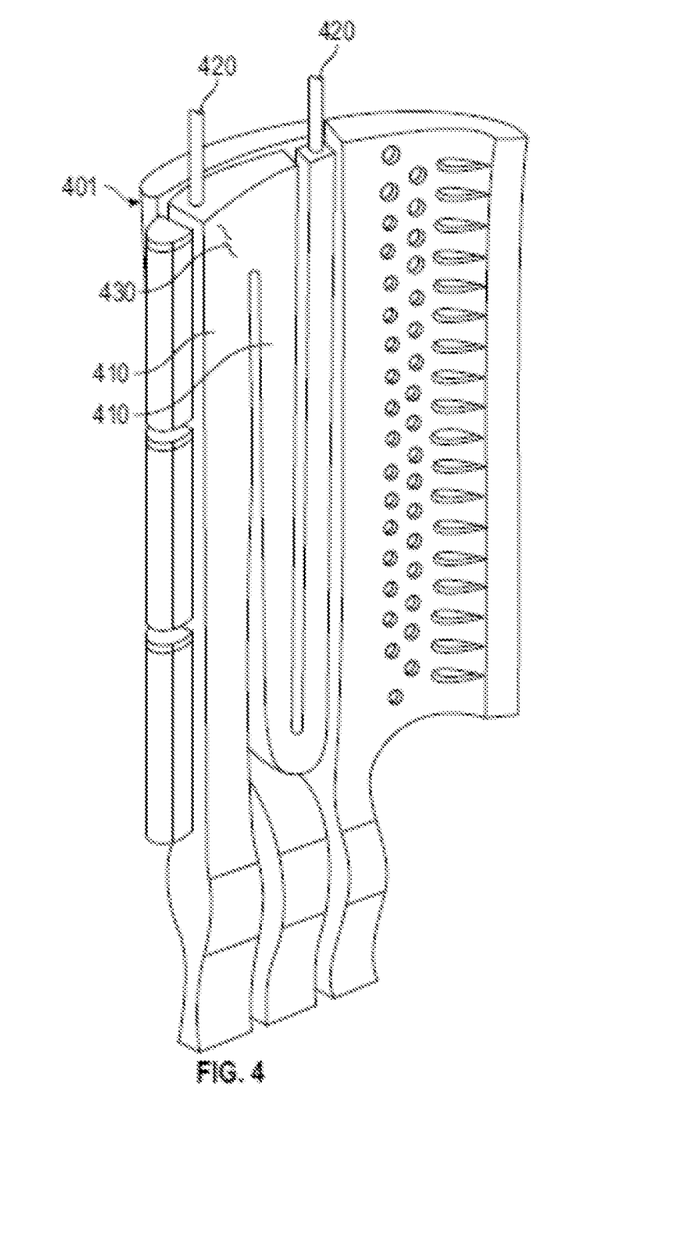
FIG. 4 is a perspective view of a core for fabricating an airfoil of the turbine blade of FIGS. 2 and 3 in accordance with embodiments.

With continued reference to FIGS. 2 and 3 and with additional reference to FIG. 4, a core 401 is provided for use in fabricating an airfoil of a blade, such as the turbine blade 201 of FIGS. 2 and 3, to include the features of the airfoil 220 described above using casting processes which will be described below. The core 401 includes channel sections 410 and tip rods 420. The channel sections 410 are configured to form the internal channels 702 (see FIG. 7) within the airfoil 220 by the casting processes. The tip rods 420 are disposed to extend from respective portions of the channel sections 410 that are located proximate to a location of the tip shelf 225 once the tip shelf 225 is eventually formed by the casting processes. That is, the tip rods 420 extend radially outwardly from distal ends of the respective portions of the channel sections 410. The respective portions of the channel sections 410 have a second sweep configuration 430 that corresponds to the first sweep configuration 701 (see FIG. 7). The tip rods 420 are configured to extend from the respective portions of the channel sections 410 or the internal channels 702 (see FIG. 7) and through the wall 226 once the tip shelf 225 and the wall 226 are eventually formed by the casting processes at the oblique angle α (i.e., about 5 degrees) relative to a normal angle of the wall 226 during the casting processes. The tip rods 420 cause the obliquely-angled through-holes 301 to form in the wall 226.

In accordance with embodiments, thickness of the tip shelf 225 can vary. For example, the thickness of the tip shelf 225 at or around the obliquely-angled through-holes 301 can be about 0.05" and the thickness of the tip shelf 225 within the squealer pocket 302 can be about 0.038" maximum, to about 0.022" minimum at the leading edge 223 or about 0.035" minimum at the trailing edge 224.

In addition to the obliquely-angled through-holes 301, the tip shelf 225 can be further formed to define additional holes 320 within the squealer pocket 302. These holes 320 can be provided for permitting fluid communication, e.g., a flow of coolant outwardly from an interior of the airfoil 220 or, more particularly, from one or more of the internal channels 702 to the squealer pocket 302 as shown in FIG. 7. The additional holes 320 can be arranged in various formations including, but not limited to, the formation 321 that is illustrated in FIG. 3 and which is characterized by having a linear grouping of additional holes 320 that become increasingly staggered with increasing distance from the trailing edge 224, at least one or more additional hole 320 located between the notched or convex sections 313 and at least one or more additional hole 320 proximate to the leading edge 223.

In accordance with embodiments, the tip rods 420 can include at least one or more of alumina and quartz.

In accordance with further embodiments, the channel sections 410 can include a bumper 430 proximate to an internal end of at least one of the tip rods 420.

Figure 5:
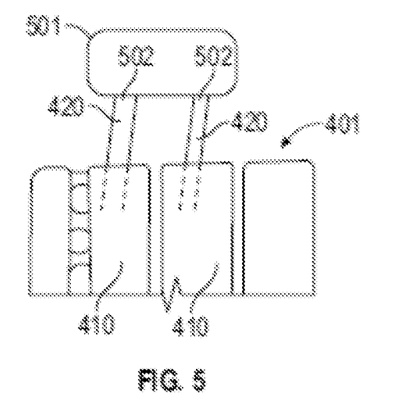
FIG. 5 is an enlarged, schematic side view of a portion of the core of FIG. 4 in accordance with embodiments.

With reference to FIG. 5, a plenum body 501 can be provided and external ends 502 of the tip rods 420 can be coupled to the plenum body 501.

Figure 6:
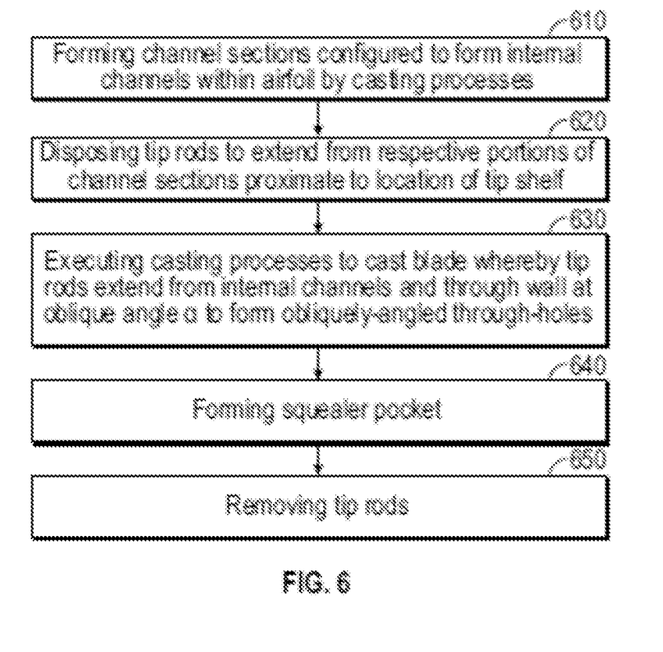
FIG. 6 is a flow diagram illustrating a method of assembling a core for fabricating a blade in accordance with embodiments.

With continued reference to FIGS. 2-5 and with additional reference to FIG. 6, a method of assembling the core 401 (see FIG. 4) is provided. As shown in FIG. 6, the method includes forming the channel sections 410 such that the channel sections 410 are configured to form the internal channels 702 (see FIG. 7) within the airfoil 220 by casting processes (block 610), disposing the tip rods 420 to extend from the respective portions of the channel sections 410 proximate to the location of the tip shelf 225 (block 620) and executing the casting processes to cast the blade whereby the tip rods 420 extend from the internal channels 702 and through the wall 226 at the oblique angle α relative to the normal angle of the wall 226 to form the obliquely-angled through-holes 301 in the wall 226 (block 630). The method can further include forming the squealer pocket 302 in the tip shelf 225 (block 640).

The executing of the casting processes of block 630 can include executing an investment casting process to cast the blade around the core 401 and to subsequently remove the core 401 from the blade once the blade is cast. This can be achieved by known methods and processes for casting and results in the definition and the formation of the airfoil 220 and the internal channels 702. The method can further include removing the tip rods 420 from the blade via the obliquely-angled through-holes 301 in the wall 226 upon completion of the investment casting process (block 650).

In accordance with embodiments, the method can also include forming the bumper 430 proximate to the internal end of at least one of the tip rods 420 and coupling the external ends of the tip rods 420 to the plenum body 501.

Except as provided herein, the squealer pocket 302 of FIG. 3 and the wall 310 can be formed by various additional or alternative processes. These include, but are not limited to, electro-dynamic machining (EDM). In some cases, where the squealer pocket 302 is formed by EDM, the additional holes 320 can be formed by cast processes or by further EDM processing.

With reference to FIG. 7, a blade structure 700 is provided. The blade structure 700 is essentially an intermediate stage structure which exists during the casting processes and includes the tip rods 420 and the airfoil 220 as each is described above. The airfoil 220 has the first sweep configuration 701 and is formed to define the internal channels 702. Here, the core 401 has already been removed by the completion of the investment casting process noted above with the airfoil 220 left remaining and intact whereby the core 401 includes the wall 226 as well as external passage wall components 710 and internal passage wall components 711 that were formed by the channel sections 410. The tip rods 420 extend from the internal channels 702 and through the wall 226 at the oblique angle α relative to the normal angle of the wall 226 to thus form the obliquely-angled through-holes 301 during the casting processes and are removable via the obliquely-angled through-holes 301.

With the tip rods 420 extending through the wall 226 at the oblique angle α, distances between the tip rods 420 and the external and internal passage wall components 710 and 711 can be maintained at or above minimum required distances with the tip rods 420 still having reliably producible dimensions and sizes of the obliquely-angled through-holes 301 being maintained at or above minimum required sizes.

In accordance with embodiments, at least one or more of the internal passage wall components 711 proximate to the internal end of at least one of the tip rods 420 can be formed to define a divot 712. The divot results from the investment casting process and the formation of the bumper 430 (see FIG. 4). To an extent the internal end of the at least one of the tip rods 420 is excessively close to the internal passage wall component 711, the divot 712 serves to recapture the minimum required distance.

Figure 8:
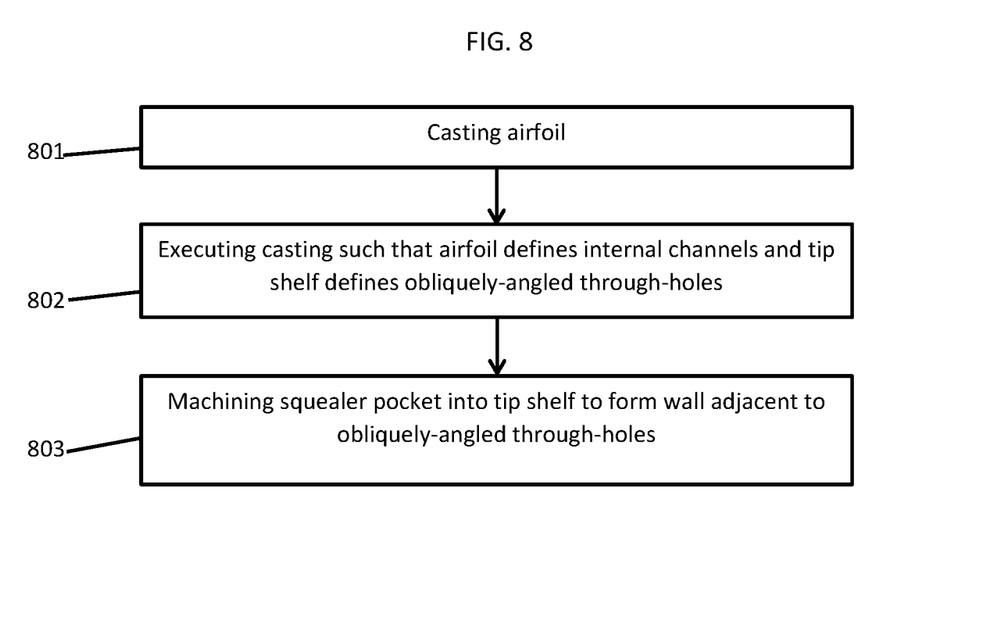
FIG. 8 is a flow diagram illustrating a method of forming an airfoil of a blade structure in accordance with embodiments.

With reference to FIG. 8, a method of forming an airfoil of a blade structure as described above is provided. The method includes casting the airfoil to include pressure and suction surfaces, leading and trailing edges extending along the pressure and suction surfaces and a tip shelf with a sweep configuration at an outboard airfoil end (801), executing the casting such that the airfoil defines internal channels and the tip shelf defines obliquely-angled through-holes (802) and machining a squealer pocket into the tip shelf with a remainder of the tip shelf forming a wall extending radially outwardly to delimit a periphery of the squealer pocket and with the obliquely-angled through-holes being adjacent to the wall (803). In accordance with embodiments, the machining of operation 803 can include electro-dynamic machining (EDM).

Figure 9:
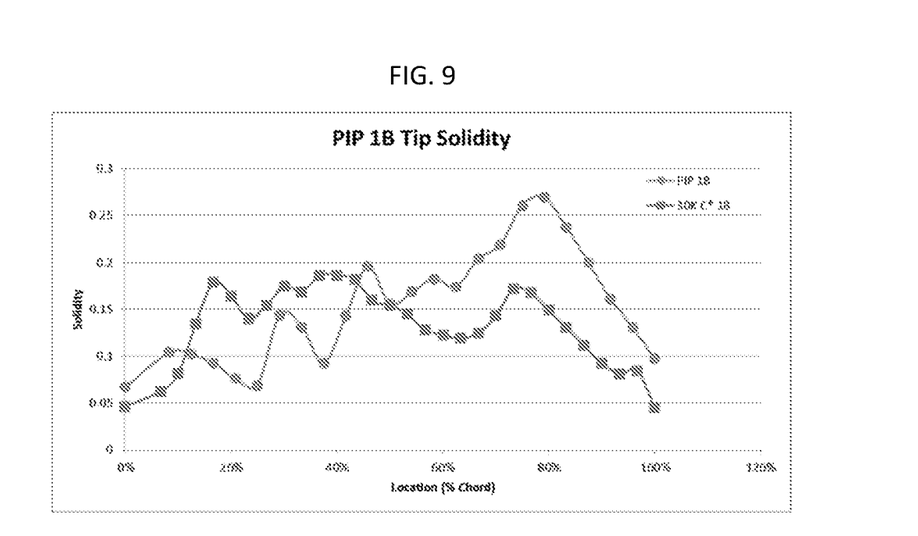
FIG. 9 is a graphical depiction of tip solidity of an airfoil in accordance with embodiments.

With reference to FIG. 9, tip solidity of the airfoil 201 described herein can vary along the chord line of the airfoil 201 as shown in the graph.

Benefits of the features described herein allows for the use of tip rods to produce holes for internal cavity dirt purge, core position control and casting in blades with an airfoil sweep.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil, comprising:
   pressure and suction surfaces;
   leading and trailing edges extending along the pressure and suction surfaces;
   a tip shelf with a sweep configuration at an outboard airfoil end; and
   a wall extending radially outwardly from the tip shelf to delimit a periphery of a squealer pocket at the tip shelf, the wall comprising an interior surface facing inwardly toward the squealer pocket, an exterior surface opposite the interior surface and notched sections at which the interior and exterior surfaces curve together around the obliquely-angled through-holes,
   the airfoil defining internal channels and the tip shelf defining obliquely-angled through-holes, which are adjacent to the wall and which are communicative with the internal channels.

2. The airfoil according to claim 1, wherein the tip shelf is curved to maintain a substantially uniform depth or is flat.

3. The airfoil according to claim 1, wherein the obliquely-angled through-holes are angled at about 5-12 degrees inclusive.

4. The airfoil according to claim 1, wherein the wall has a substantially uniform thickness along the pressure surface.

5. The airfoil according to claim 4, wherein the wall has a thickness along the suction surface that exceeds the substantially uniform thickness along the pressure surface.

6. The airfoil according to claim 1, wherein:
   the notched sections comprise a first notched section proximate to the leading edge and a second notched section proximate to the trailing edge, and
   the wall further comprises a flat section between the first notched section and the second notched section.

7. The airfoil according to claim 1, wherein:
   the notched sections comprise a first notched section proximate to the leading edge and a second notched section proximate to the trailing edge, and
   the tip shelf is formed to define additional holes within the squealer pocket, at least one of the additional holes being located between the first notched section and the second notched section.

8. The airfoil according to claim 7, wherein the additional holes provide fluid communication between the internal channels and the squealer pocket.

9. The airfoil according to claim 1, wherein a thickness of the wall along the suction surface varies.

10. The airfoil according to claim 1, wherein the wall has a wedge shape at the suction surface.

11. A method of forming an airfoil according to claim 1 of a blade structure, the method comprising:
    casting the airfoil according to claim 1 to comprise the pressure and suction surfaces, the leading and trailing edges extending along the pressure and suction surfaces and the tip shelf with the sweep configuration at the outboard airfoil end;
    executing the casting such that the airfoil defines the internal channels and the tip shelf defines the obliquely-angled through-holes; and
    machining the squealer pocket into the tip shelf with a remainder of the tip shelf forming the wall extending radially outwardly to delimit the periphery of the squealer pocket and with the obliquely-angled through-holes being adjacent to the wall.

12. The method according to claim 11, wherein the machining comprises electro-dynamic machining.

13. An airfoil, comprising:
    pressure and suction surfaces;
    leading and trailing edges extending along the pressure and suction surfaces;
    a tip shelf with a sweep configuration at an outboard airfoil end; and
    a wall extending radially outwardly from the tip shelf to delimit a periphery of a squealer pocket at the tip shelf, the wall comprising an interior surface facing inwardly toward the squealer pocket, an exterior surface opposite the interior surface and notched sections at which the interior and exterior surfaces curve together around the obliquely-angled through-holes, the wall having a substantially uniform thickness along the pressure surface and the airfoil defining internal channels and the tip shelf defining obliquely-angled through-holes, which are angled at about 5-12 degrees inclusive, adjacent to the wall, and which are communicative with the internal channels.

14. The airfoil according to claim 13, wherein the tip shelf is curved to maintain a substantially uniform depth or is flat.

15. The airfoil according to claim 13, wherein the wall has a thickness along the suction surface that exceeds the substantially uniform thickness along the pressure surface.

16. The airfoil according to claim 13, wherein:
the notched sections comprise a first notched section proximate to the leading edge and a second notched section proximate to the trailing edge,
the wall further comprises a flat section between the first notched section and the second notched section, and
the tip shelf is formed to define additional holes within the squealer pocket, at least one of the additional holes being located between the first notched section and the second notched section.

17. The airfoil according to claim 16, wherein the additional holes provide fluid communication between the internal channels and the squealer pocket.

18. The airfoil according to claim 14, wherein a thickness of the wall along the suction surface varies.

19. The airfoil according to claim 14, wherein the wall has a wedge shape at the suction surface.

* * * * *